US012264525B2

(12) United States Patent
Anselmi et al.

(10) Patent No.: US 12,264,525 B2
(45) Date of Patent: Apr. 1, 2025

(54) DEVICE FOR CLOSING AND/OR OPENING OF A LEAF

(71) Applicant: ANSELMI & C. S.R.L., Roncade (IT)

(72) Inventors: Giulio Anselmi, Treviso (IT); Alberto Tassi, Ponzano Veneto (IT)

(73) Assignee: ANSELMI & C. S.R.L., Roncade (IT)

( * ) Notice: Subject to any disclaimer, the term of this patent is extended or adjusted under 35 U.S.C. 154(b) by 21 days.

(21) Appl. No.: 18/036,632

(22) PCT Filed: Nov. 19, 2021

(86) PCT No.: PCT/IB2021/060735
§ 371 (c)(1),
(2) Date: May 11, 2023

(87) PCT Pub. No.: WO2022/107056
PCT Pub. Date: May 27, 2022

(65) Prior Publication Data
US 2023/0417095 A1 Dec. 28, 2023

(30) Foreign Application Priority Data
Nov. 20, 2020 (IT) ........................ 102020000027927

(51) Int. Cl.
*E05F 1/14* (2006.01)

(52) U.S. Cl.
CPC ........... *E05F 1/14* (2013.01); *E05Y 2201/638* (2013.01); *E05Y 2900/132* (2013.01); *E05Y 2900/20* (2013.01)

(58) Field of Classification Search
CPC ................. E05F 1/14; E05Y 2201/638; E05Y 2900/132; E05Y 2900/20
See application file for complete search history.

(56) References Cited

U.S. PATENT DOCUMENTS 882,721 A * 3/1908 Soss .......................... E05F 3/20 16/68
1,926,431 A * 9/1933 Busch .................. E05F 1/1253 16/298

(Continued)

FOREIGN PATENT DOCUMENTS

| | | |
|---|---|---|
| DE | 1584230 | 12/1965 |
| GB | 1252757 | 11/1971 |
| GB | 2503753 A | 1/2014 |

*Primary Examiner* — Jason W San
*Assistant Examiner* — Matthew J Sullivan
(74) *Attorney, Agent, or Firm* — Carmel Patent Agency; Robert Ballarini

(57) ABSTRACT

Device for the closing and/or opening of a leaf, to be applied to a concealed hinge comprising two bodies articulated to each other through at least a pair of articulation arms and connectable respectively to a leaf and to a fixed structure, the device being intended to be associated with one of the two bodies of the hinge, the device including:
- a translating element engageable to/with an articulation arm of the hinge,
- at least one mobile group configured to cooperate with the translating element and which is mobile with respect to an element/structure which can be mechanically fixed to the hinge body to which the device is to be associated;
- elastic means acting on the mobile group to cause the movement of the mobile group and the translating element;

the translating element, the at least one mobile group and the elastic means are configured and reciprocally arranged.

20 Claims, 6 Drawing Sheets

(56) References Cited

U.S. PATENT DOCUMENTS

| | | | | | |
|---|---|---|---|---|---|
| 2,709,276 | A * | 5/1955 | Stein | E05D 7/14 | 16/288 |
| 2,779,967 | A * | 2/1957 | Braun | E05F 1/1261 | 16/291 |
| 3,613,151 | A * | 10/1971 | Anderson et al. | E05D 11/1014 | 16/278 |
| RE27,546 | E * | 1/1973 | Hocq | E05F 1/1215 | 16/295 |
| 4,141,104 | A * | 2/1979 | Watson | E05D 11/10 | 16/80 |
| 4,216,985 | A * | 8/1980 | Sorensen | E05B 13/002 | 292/336.3 |
| 4,613,174 | A * | 9/1986 | Berg | B61D 9/12 | 292/136 |
| 4,893,850 | A * | 1/1990 | Mizusawa | E05D 15/505 | 292/DIG. 55 |
| 7,761,958 | B2 * | 7/2010 | Alfredsson | E05D 7/1066 | 16/261 |
| 8,136,849 | B2 * | 3/2012 | Hakemann | E05C 3/124 | 292/96 |
| 8,407,858 | B2 * | 4/2013 | Ahn | G06F 1/1681 | 16/296 |
| 8,627,547 | B2 * | 1/2014 | Soh | E05F 1/1253 | 439/31 |
| 8,650,713 | B2 * | 2/2014 | Migliorini | E05D 11/1021 | 16/370 |
| 9,617,769 | B2 * | 4/2017 | Polo Friz | E05D 3/186 | |
| 9,752,364 | B2 * | 9/2017 | James | E05D 11/1014 | |
| 9,822,570 | B2 * | 11/2017 | Jaranson | E05F 1/10 | |
| 10,152,095 | B2 * | 12/2018 | Lin | H05K 5/0226 | |
| 10,301,859 | B2 * | 5/2019 | Miglioranzo | E05F 3/12 | |
| 10,458,168 | B2 * | 10/2019 | Hammerer | E05F 1/1253 | |
| 10,472,870 | B2 * | 11/2019 | Tassi | E05F 3/10 | |
| 10,494,845 | B2 * | 12/2019 | Yamaguchi | E05D 3/16 | |
| 10,563,439 | B2 * | 2/2020 | Miglioranzo | E05D 7/04 | |
| 10,906,733 | B2 * | 2/2021 | Poyner | E05C 17/025 | |
| 11,060,338 | B2 * | 7/2021 | Reid | E05F 3/108 | |
| 11,248,406 | B2 * | 2/2022 | Nordieker | E05F 1/1058 | |
| 11,441,346 | B2 * | 9/2022 | Caccaro | E05F 5/02 | |
| 11,542,738 | B2 * | 1/2023 | Daniels | E05F 3/108 | |
| 11,753,857 | B2 * | 9/2023 | Giovannetti | E05D 3/142 | 16/50 |
| 11,781,362 | B2 * | 10/2023 | Lee | E05D 11/1028 | 16/50 |
| 11,788,331 | B2 * | 10/2023 | Tsuruoka | E05F 1/1284 | 16/357 |
| 11,965,369 | B2 * | 4/2024 | Ferrari | E05D 3/18 | |
| 12,037,807 | B2 * | 7/2024 | Reeder | F16C 11/10 | |
| 2004/0187858 | A1 * | 9/2004 | Ramsey | E05B 47/0012 | 126/192 |
| 2008/0250606 | A1 * | 10/2008 | Peng | G06F 1/1616 | 16/353 |
| 2009/0193619 | A1 * | 8/2009 | Irwin | E05D 5/04 | 16/386 |
| 2009/0241287 | A1 * | 10/2009 | Reid | F16F 9/585 | 16/58 |
| 2012/0085036 | A1 * | 4/2012 | Nishida | E05F 1/14 | 49/386 |
| 2013/0067686 | A1 | 3/2013 | Migliorini | | |
| 2020/0123831 | A1 * | 4/2020 | Xu | E05F 5/08 | |
| 2021/0180378 | A1 * | 6/2021 | Windmann | E05D 11/1064 | |
| 2023/0151655 | A1 * | 5/2023 | Liermann | E05D 3/186 | 16/233 |
| 2023/0184017 | A1 * | 6/2023 | Lai | E05F 1/1253 | 16/54 |
| 2024/0110421 | A1 * | 4/2024 | Ran | E05F 3/20 | |

* cited by examiner

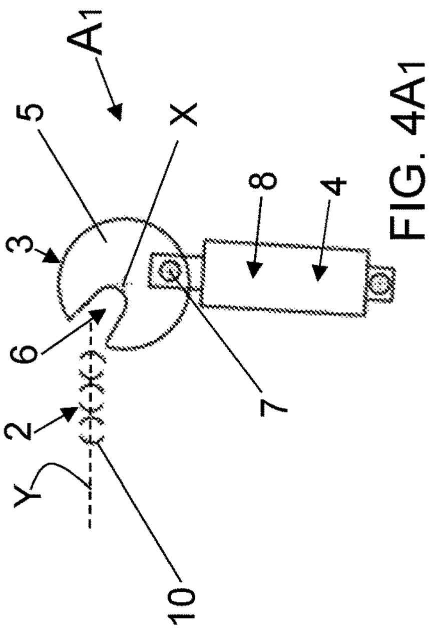
FIG. 4A1
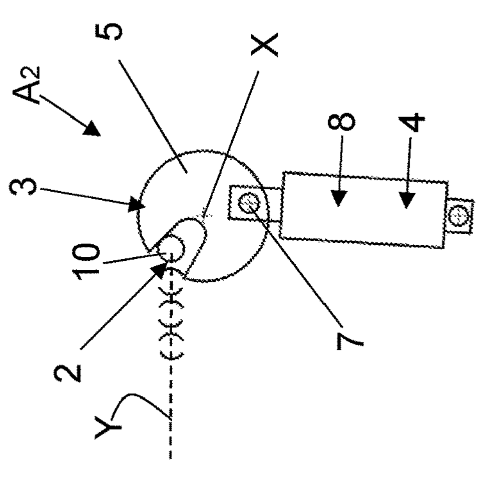
FIG. 4A2
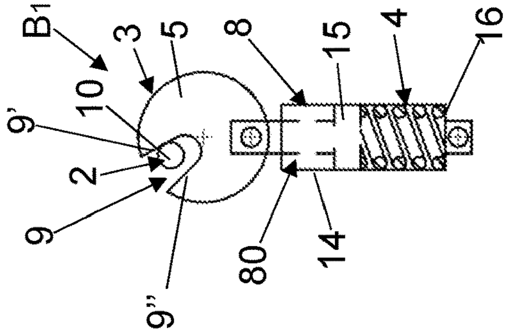
FIG. 4B1
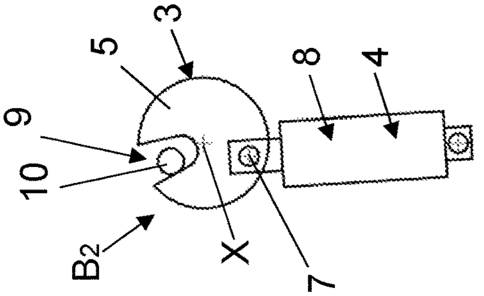
FIG. 4B2
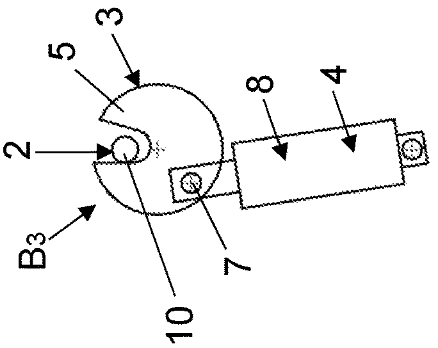
FIG. 4B3

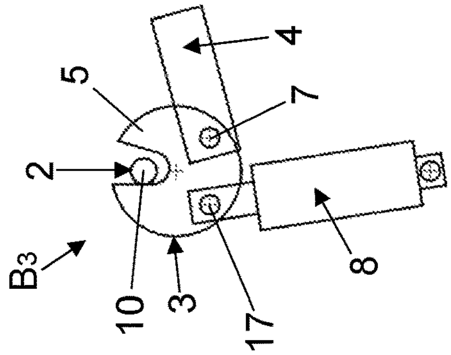
FIG. $5B_3$
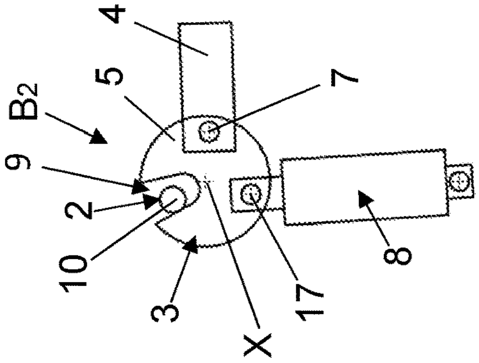
FIG. $5B_2$
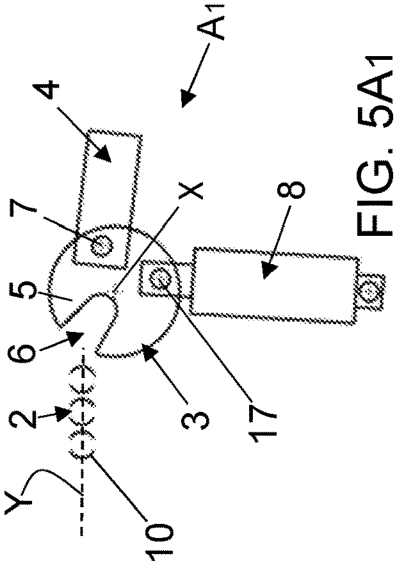
FIG. $5A_1$
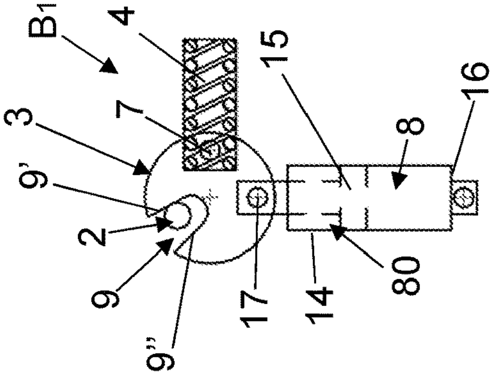
FIG. $5B_1$
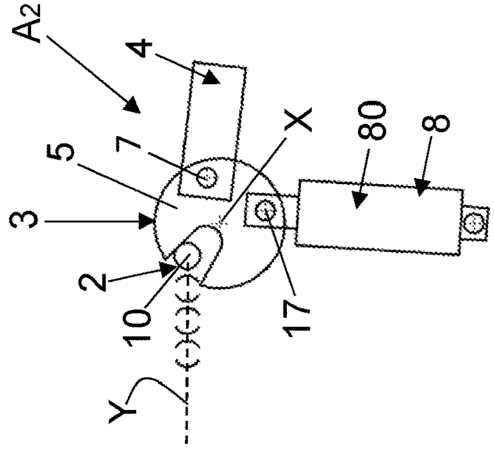
FIG. $5A_2$

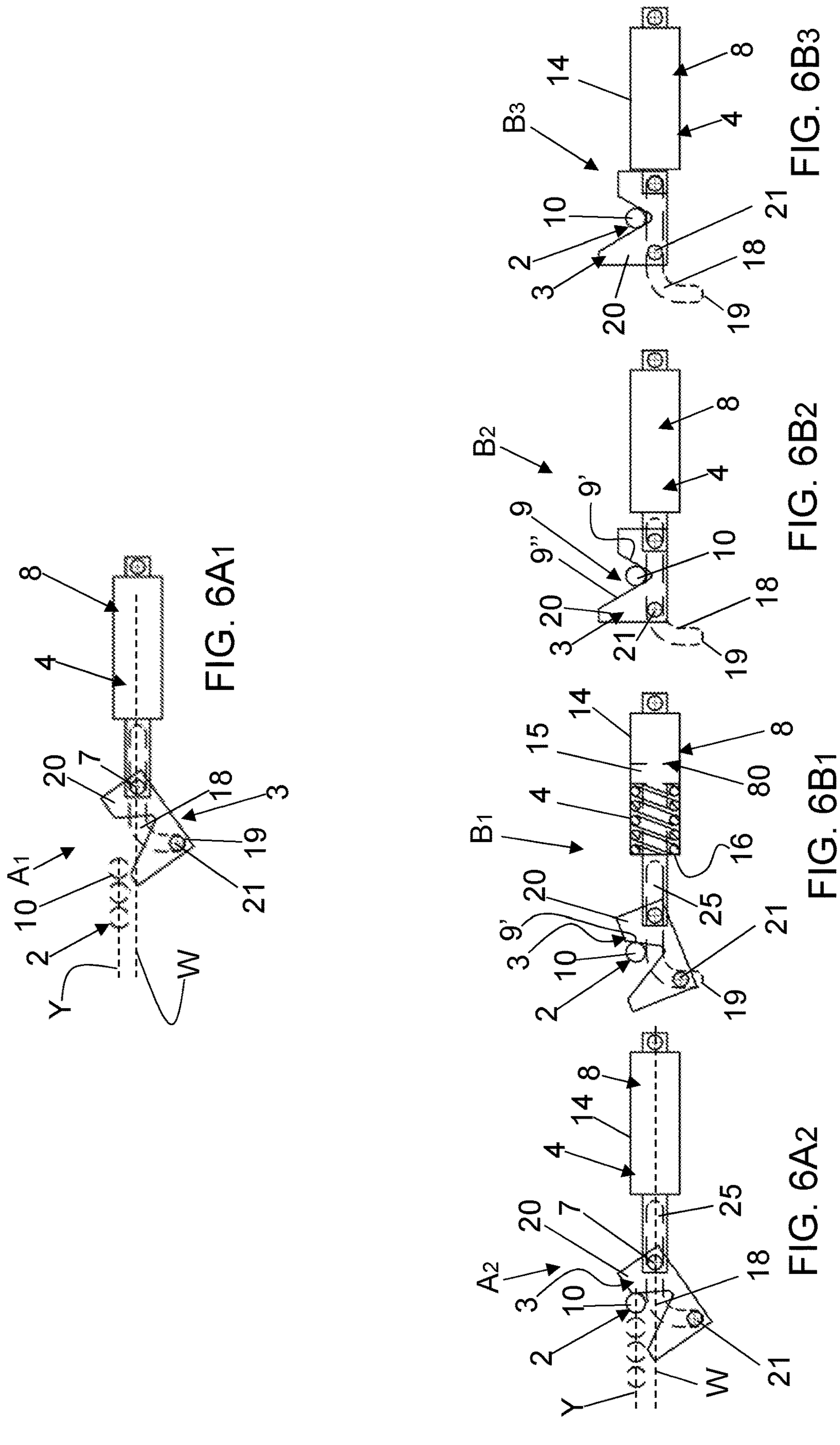
FIG. 6A1
FIG. 6A2
FIG. 6B1
FIG. 6B2
FIG. 6B3

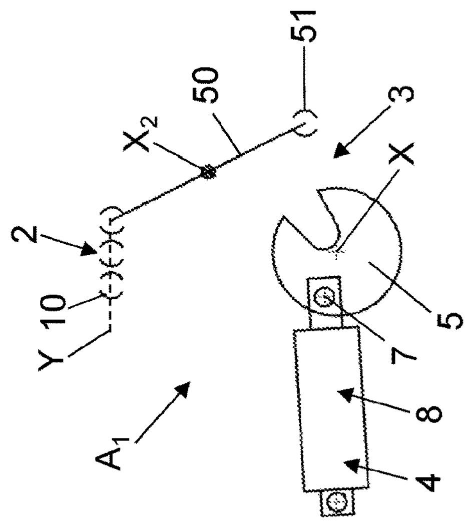
FIG. 7A1
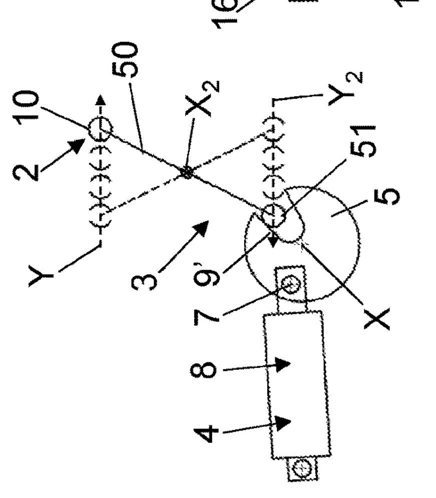
FIG. 7A2
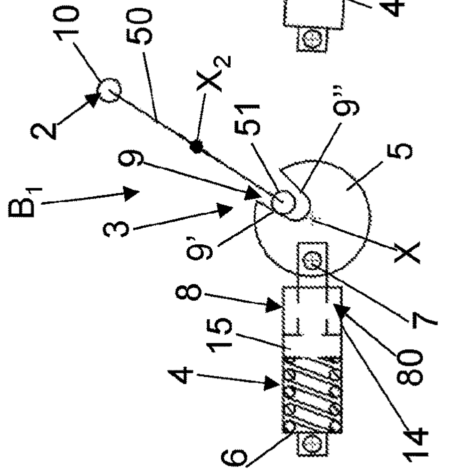
FIG. 7B1
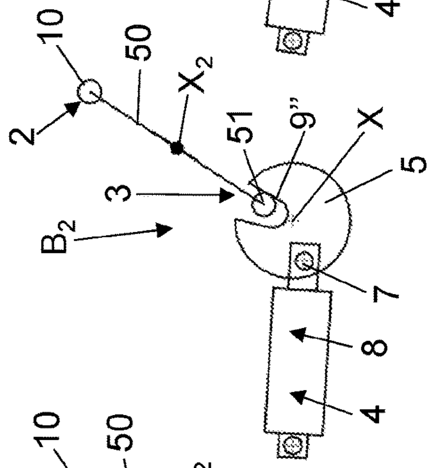
FIG. 7B2
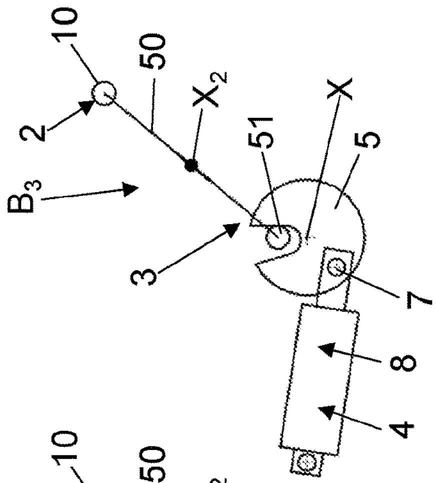
FIG. 7B3

DEVICE FOR CLOSING AND/OR OPENING OF A LEAF

FIELD OF THE INVENTION

The present invention relates to a device for opening and/or closing a door, for example a wardrobe or a door, articulated by means of a concealed hinge to a fixed structure or jamb, for example a wardrobe or a door.

BACKGROUND

Devices for the automatic closing of a door are known provided with movable external arms, articulated to the door itself. These devices are not completely satisfactory as they are bulky and not aesthetically pleasing.

There are also known devices hidden and embedded in the thickness of the door and also referred to as invisible door closers.

For example, there are known hinges equipped with door closers described in documents WO 2015/145364, GB 2503753, GB 1252757, U.S. Pat. No. 897,825 and DE 1584230

All the solutions listed above provide that the door closer device forces the door leaf to close regardless of the angular position of the latter.

In other words, the door leaf is constantly subjected to a force determined by the door closing device which always and continuously forces it to close automatically. However, this provision has some drawbacks.

The main drawback of known hinges and devices resides in the fact that even if the user wishes to keep the door leaf open, the latter is forced to close, due to the effect of the door closing device.

In order to lock the leaf of a door in the open position, locking means are known which are configured to intercept the leaf once it is placed in the open position, such as for example wedges to be inserted under the lower edge of the leaf. These wedges block the door leaf in the open position by interfering with the floor by friction.

Otherwise, locking means exist, for example magnetic, comprising a first magnet fixed for example on a wall adjacent to the leaf and a ferromagnetic element fixed to the door leaf, positioned so as to abut against the magnet when the leaf reaches in the open position. In this way, the magnet holds the door leaf in the aforementioned open position.

However, all the aforesaid locking means have proved to be not free from drawbacks in practice, since they require further installation and/or application of further elements, effectively increasing the cost and installation time of the door.

U.S. Ser. No. 10/472,870 relates to a device, which can be applied in concealed hinges, for the automatic closure of the door and which also allows the automatic closing speed of the door to be easily adjusted. In particular, this device comprises a translating element 34 engageable to an articulation arm of the hinge, and also comprises elastic means interposed between a first element associated with the translating element and a second element associated with the body of the hinge; the elastic means are configured to be loaded during the opening rotation of the door associated with the hinge 4 and to always return on the translating element 34 the mechanical energy accumulated in said opening phase in order to cause a closure which is always automatic of the door, and in particular it is automatic starting from any angular position of the door itself.

US2013/067686 relates to a concealed hinge with an integrated closing device which comprises a first cam element and a second cam element, obtained on respective portions of the arm which rotates around a pin of a first element of the hinge, and also comprises a first push rod which is pushed by a first elastic element in contact with the first cam element, and a second push rod which is pushed by a second elastic element in contact with the second cam element. The closing device is configured in such a way that in a first angular field the closing movement is caused by the progressive unloading of the first elastic element, while in a second angular field the closing movement is caused by the progressive unloading of the second elastic element.

SUMMARY

The object of the invention is to propose a device for opening and/or closing a door which overcomes, at least in part, the drawbacks of traditional solutions.

Another object of the invention is to propose a device which allows the door leaf to be kept in the open position, obviating the need to actively lock the leaf with external means.

Another object of the invention is to propose a device which allows the automatic opening and/or closing of a leaf only after a predefined angle.

Another object of the invention is to propose a device which allows the automatic opening and/or closing of a door only in the final angular section.

Another object of the invention is to propose a device which allows the automatic opening and/or closing of a leaf only after a predefined angle, also regulating the speed of said automatic closing.

Another object of the invention is to propose a device that allows the automatic opening and/or closing of a leaf only after a predefined angle, while at the same time decreasing the automatic closing speed of the leaf as it approaches the door jamb.

Another object of the invention is to propose a device that allows the automatic opening and/or closing of a leaf only after a predefined angle, while allowing both the slowing down of the automatic opening and/or closing of the leaf so as to avoid sudden contacts between the door itself and the jamb, and the engagement of the snap lock associated with the door within the corresponding seat obtained in the jamb.

Another object of the invention is to propose a device which can be associated with hinges of different types, and in particular with existing hinges.

Another object of the invention is to propose a device which can be installed in a simple, easy, quick and precise way.

Another object of the invention is to propose a compact device with a reduced number of components.

Another object of the invention is to propose a device having a significantly lower production cost than traditional ones.

Another object of the invention is to propose a device which, once installed in the door, is completely invisible.

Another object of the invention is to propose a device which has an alternative characterization, both in constructive and functional terms, with respect to the traditional ones.

These purposes, both individually and in any combination thereof, as well as others that will emerge from the following description, are achieved, according to the invention, with a device for opening and/or closing a door and with a system for opening and/or closing a door as set forth in the appended claims.

BRIEF DESCRIPTION OF THE DRAWINGS

The present invention is further clarified hereinafter in some of its preferred embodiments reported for purely illustrative and non-limiting purposes. with reference to the attached drawings, in which.

DETAILED DESCRIPTION OF THE PREFERRED EMBODIMENTS

Figure 2:
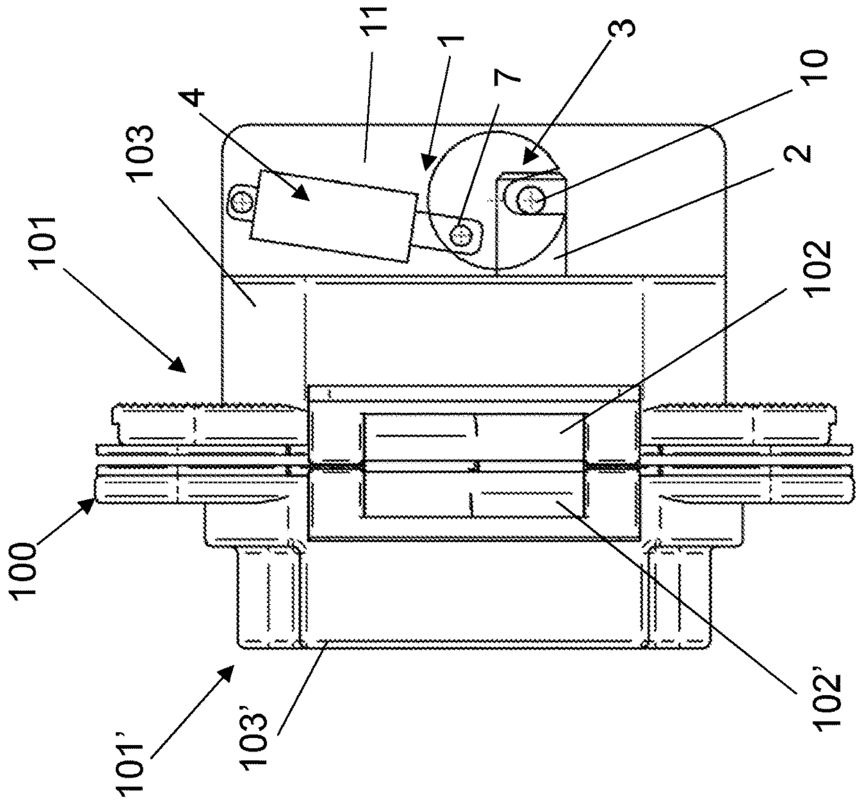
FIG. 2 shows it in a perspective view applied to an articulation hinge in the closed condition.

As can be seen from the figures, the opening and/or closing device according to the invention, indicated as a whole with the reference "1", is intended to be associated with a hinge 100 for articulating a door with respect to a fixed structure, for example to a jamb of a door, and is intended to be built into a corresponding housing cavity made in the door and/or in the fixed structure.

Preferably, the hinge 100 is of the retractable type since it is invisible when the door is closed. Furthermore, preferably, the hinge 100 is of the type which allows to carry out rotational movements of the door up to about 180° with respect to the fixed structure.

In particular, the hinge 100 comprises two hinge bodies 101, 101' connected to each other by a pair of arms 102, 102', advantageously shaped like a rocker arm, which allow the door to rotate with respect to the jamb.

Conveniently, the hinge bodies 101, 101' respectively comprise two flanged containers 103, 103', both preferably cup-shaped, which are respectively recessed into the thickness of the door and of the jamb, and two corresponding blocks which are housed—and preferably adjustable—inside the respective flanged containers. Conveniently, in a possible embodiment not shown here, it can be provided that each flanged container 103, 103' is made in a single piece with the corresponding block.

More in detail, each flanged container 103, 103' of the hinge bodies 101, 101' has two flat end flanges 104 separated from each other by an intermediate portion of substantially parallelepiped shape, preferably provided with a rounding in correspondence with its two smaller facing walls.

Figure 1:
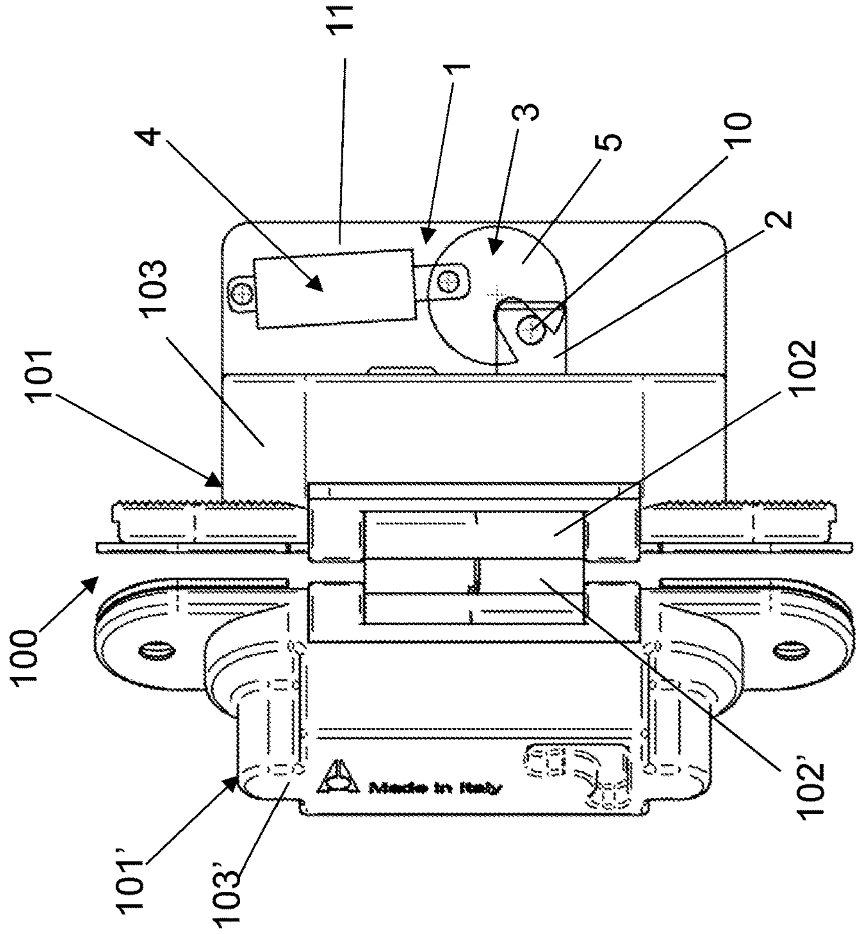
FIG. 1 shows a perspective view of a first embodiment of the device according to the invention, applied to a hinge, in the open condition, of articulation of a door to a jamb.
Figure 3:
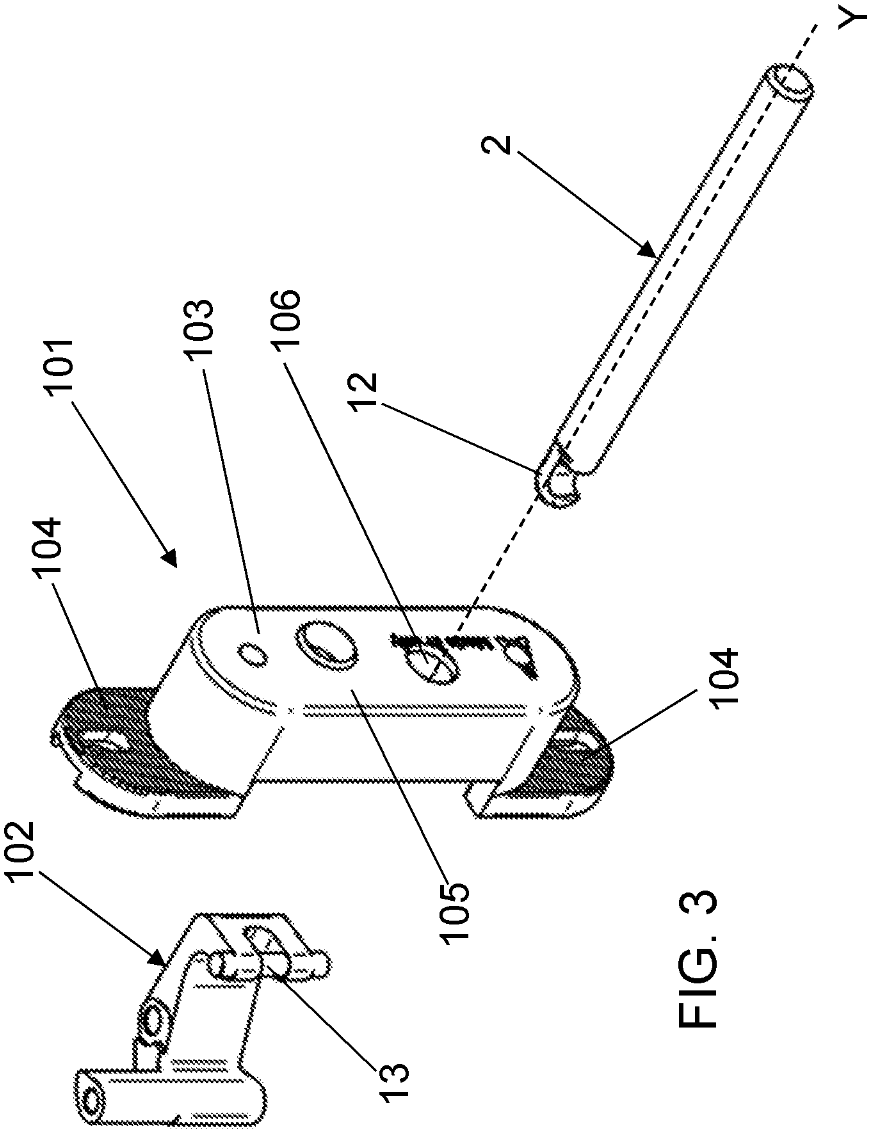
FIG. 3 shows the translating element in an exploded perspective view of the device according to the invention with the components of a hinge body to which the device is intended to be associated, FIGS. 4$A_1$-4$B_3$ show a schematic side view of the device according to the invention in successive conditions during the movement of closure of the hinge, in a first embodiment thereof, FIGS. 5$A_1$-5$B_3$ show a schematic side view of the device according to the invention in successive conditions during the closing movement of the hinge, in a second embodiment thereof, FIGS. 6$A_1$-6$B_3$ show a schematic side view of the device according to the invention in successive conditions during the closing movement of the hinge, in a third embodiment thereof, FIGS. 7$A_1$-7$B_3$ show a schematic side view of the device according to the invention under subsequent conditions during the closing movement of the hinge, in a fourth embodiment thereof.

It should be noted that hereinafter the "closed" condition of the hinge 100 (or of the door) means the condition in which the door is closed and the two bodies of the hinge 101, 101' face each other (see FIG. 2). By "open" condition of the hinge 100 (or of the door), on the other hand, we mean the condition in which the two hinge bodies 101, 101' are no longer facing each other (see FIG. 1).

Further, by "opening of the hinge or of the door" is meant the rotation of the door to make the hinge 100 pass from the closed condition to the open condition. Correspondingly, by "closing of the hinge or door" is meant the rotation of the door to bring the hinge 100 back from the open condition to the closed condition.

Preferably, in accordance with the embodiment illustrated in the attached figures, the device 1 is housed in a containment body 11 mechanically fixed to the body 101 of the hinge 100 and internally defines a containment volume for the device itself.

Advantageously, in a possible embodiment not shown in the attached figures, the device 1 can have no containment body and thus be housed directly inside a housing cavity formed in the door.

The device 1 comprises a translating element 2, preferably rod-shaped, engageable to/with an articulation arm 102 of the hinge 100.

Preferably, the translating element 2 has, at one end, a hook and/or a hole 12 intended to engage directly with a pin 13, or other functionally and/or structurally equivalent section, provided at the end of one of the articulation arms 102 of the hinge 100.

Advantageously, in accordance with a preferential embodiment such as that illustrated in the attached figures, the intermediate portion of each flanged container 103, 103' of the hinge 100 comprises a bottom wall 105 intended to be inserted inside a corresponding housing cavity of the door or of the fixed structure.

The bottom wall 105 advantageously has at least one through hole 106 configured to be crossed by the translating element 2 of the device 1 according to the invention.

More in detail, preferably, the articulation arm 102 is housed with its pin 13 inside the flanged container 103, with the pin in particular facing the through hole 106 (correct drawing), from which the translating element 2 protrudes with its hook/hole 12, to engage with the pin 13 itself in a shape relationship. For example, the hook 12 may have a hook shape to engage in a formal relationship with the pin 13 of the articulation arm 102.

The device 1 also comprises at least one mobile group 3 which is configured to cooperate with the translating element 2. In particular, the translating element 2 selectively cooperates with the mobile group 3, which in particular is movable in rotation and/or translation and/or roto-translation with respect to an element/structure which is integral with the hinge body 101, preferably is integral with the containment body 11 of the device 1 which is fixed to said hinge body 101.

Conveniently, the mobile group 3 comprises:

- at least one rotating element 5 which rotates around an axis of rotation X, which is mounted/constrained and integral with a containment body 11 which can be associated with the hinge body 101 and which is substantially transverse/perpendicular to the translation axis Y of said translating element 2, and/or at least one carriage 20 or slide which can rotate-translate along a guide 18 which is integral with a containment body 11 which can be associated with the hinge body 101, at least one sliding element (not shown) which translates, preferably along a guide, with respect to a containment body 11 which can be associated with the hinge body 101.

The device 1 also comprises elastic means 4 acting on the mobile group 3 to cause the movement of said mobile group 3 and, therefore, also of said translating element 2. Conveniently, the elastic means 4 are mechanically associated with the mobile group 3 and cooperating with the mobile group 3 to assist/at least partially cause the automatic movement of the mobile group 3, and thus causing the translation of the translating element 2.

Conveniently, the movable assembly 3 is mechanically associable with a hinge body 101 and, preferably, is mounted on a containment body 11 associable with said hinge body 101. Conveniently, the movable assembly 3 and the elastic means 4 are mounted externally with respect to the hinge body 101 and, in particular, are external with respect to the container flanged (preferably cup-shaped) of said hinge body.

Conveniently, the elastic means 4 can be mechanically associated with an element/structure which is integral with the hinge body 101 and, preferably, are mounted on a containment body 11 which can be associated with said hinge body 101.

Conveniently, the elastic means 4 act between the mobile group 3 and an element/structure (preferably defined by the containment body 11) which is integral with the hinge body 101. In particular, the elastic means 4 have one end associated with the mobile group 3 while the other end is associated to the element/structure (preferably defined by the containment body 11) which is integral with the hinge body 101.

Advantageously, the elastic means 4 comprise at least one spring 4, preferably a spring of the helical or solenoidal type.

Conveniently, the device 1 is configured—and in particular the translating element 2, the mobile group 3 and the elastic means 4 are configured and reciprocally arranged—so that the rotation/closing or opening movement of the door associated with said hinge 100 includes:

a first phase in which the closing or opening movement/rotation of the door/hinge can be activated and caused only by an external force/action, for example by the user; therefore, in the absence of this external force/action, the door/hinge does not rotate and is not moved, a second phase, preferably following said first phase during the closing or opening movement/rotation of the leaf/hinge, in which said closing or opening movement/rotation of the leaf/hinge occurs automatically, i.e. it does not require any force external, in particular by the user.

In particular, therefore, unlike traditional solutions, the elastic means 4 do not act during the entire/full movement/rotation of the door/hinge closure, but only act below a predefined angle (for example between 0° and 45°) which is defined with respect to the closing or opening position of the door/hinge.

Preferably, the elastic means 4 associated with the mobile group 3 are the only elastic means of the device 1 and, in particular, no further elastic means are provided which are associated with the mobile group 3.

Advantageously, the device 1 is configured so that the passage from the first phase to the second phase is caused by a movement of the mobile group 3 which is caused by the translation of said translating element 2, preferably until a condition $B_1$ is reached in which the elastic means 4 are free to stretch to thus cause automatic movement of said mobile group 3, and therefore of said translating element 2, and therefore of said hinge/door.

Advantageously, the device 1 also comprises damping means 8 acting on the mobile group 3, to thus brake/slow down the translation movement of the translating element 2. Advantageously, as mentioned, the damping means 8 are mechanically associated with the mobile group 3 to absorb at least partially the thrust exerted by the elastic means 4 on the mobile group 3.

Although in the embodiments illustrated in the figures the damping means 8 are always present and illustrated, it is understood that in the device 1 according to the invention the damping means 8 may not be present.

Conveniently, said damper means 8 act between the movable assembly 3 and a structure (preferably defined by the containment body 11) which is integral with the hinge body 101. In particular, the damper means 8 have an end associated with the movable assembly 3, while the other end is associated—directly or by means of elastic means 4—to the structure (preferably defined by the containment body 11) which is integral with the hinge body 101.

Conveniently, the damping means 8 are associated with the mobile group 3 in a manner to brake the translation of the translating element 2 only when said translation is caused by the movement of the mobile group 3 (ie during the second phase), and not when it is caused by an action external to the device itself (i.e. during the first phase).

Preferably, said damper means 8 comprise at least one shock absorber 80. Advantageously, said shock absorber 80 is associated with said mobile group 3 so that, for the whole or at least a part of said (second) automatic movement phase of the movable assembly 3 by the elastic means 4, said shock absorber acts on said mobile group 3 to dissipate the energy of said elastic means 4, and thus slow down the automatic translation speed of the translating element 2 and therefore the automatic closing/opening of the door associated with the hinge.

Advantageously, said shock absorber 80 can be of the hydraulic type and comprises a cylindrical body 14, which contains a fluid (preferably oil but conveniently could also be a pressurized gas), and a rod 15 which is provided at one end with a piston sliding on the inside the cylindrical body 14 so as to vary the volume of the chamber in which the fluid is contained. Preferably, the shock absorber 80 can comprise a cylinder-piston system of the pneumatic type, in which the piston is forced to move inside the cylinder overcoming a compressive force of a fluid present inside the cylinder, in particular air.

Preferably, the rod 15 of the shock absorber 80 is rotatably mechanically constrained to one of its protruding ends in correspondence with the mobile group 3, while the cylindrical body 14 is rotatably mechanically constrained at one of its opposite ends to the body 101 of the hinge 100 and preferably is fixed to the containment body 11 in which the entire device 1 is housed. In this way, whenever the rod 15 moves smoothly inside the cylindrical body 14, the latter must overcome a compressive force of the fluid volume or gas inside it, effectively braking any movement imparted thereto, as will be described in more detail below.

Conveniently, said shock absorber 80 is installed on the mobile group 3 and is configured in such a way that it starts to act on said mobile group 3, and therefore on said translating element 2, to dissipate the energy of said elastic means 4 when, during the automatic rotation opening or closing of the door/hinge, the latter defines an angle, defined with respect to its closing or opening position, which is equal to or less than the predefined angle (always defined with respect to its closing or opening position) in which the elastic means 4 begin to act to cause automatic closing or opening of the door/hinge.

Preferably, said shock absorber 80 is configured in such a way that, during said (second) automatic closing phase of said hinge 4, said shock absorber acts on said movable unit 3, and therefore on said translating element 2 first to dissipate the energy of said elastic means 4 in a greater way and thus slow down the automatic closing speed of the door 5 associated with said hinge, and subsequently to dissipate in a lower way the elastic energy of said elastic means 4 and thus allow the snap lock of the door associated with said hinge engages within a corresponding seat obtained in said fixed structure 6. Advantageously, the shock absorber 80 is configured so that, during its compression, the stroke of the piston inside the cylindrical body presents, in sequence, at least two different sliding speeds, of which the subsequent one is preferably greater than the previous one. Advantageously, said shock absorber 80 is configured so as to have different combinations of diameter between the cylindrical body and the piston so as to define corresponding different sliding speeds of the piston inside the cylindrical body. Advantageously, the shock absorber 80 can be of the type described in WO2017/212453, the corresponding content of which is understood to be here entirely incorporated by reference.

Advantageously, in a possible embodiment (see FIG. 4$A_1$-4$B_3$, FIG. 6$A_1$-6$B_3$ and FIG. 7$A_1$-7$B_3$), the elastic means 4 and the damping means 8 can act along the same direction and, preferably, for this purpose they are aligned and contained in the same cylindrical body 14, as will be described in more detail below. Conveniently, in this case, only the elastic means 4 are associated with the mobile group 3 and only the damping means 8 are associated with the element/structure integral with the hinge body 101, or vice versa.

Advantageously, in a possible embodiment (see FIG. 5$A_1$-5$B_3$), the elastic means 4 and the damping means 8 act along two different directions and, preferably, for this purpose both have an end associated with the mobile assembly 3 and an end associated with the element/structure integral with the hinge body 101.

Conveniently, the device 1 is configured in such a way as to present at least one condition A1 in which the translating element 2 does not cooperate with the mobile group 3 (cf. FIG. 4$A_1$, 5$A_1$, 6$A_1$, 7$A_1$) or—in a possible embodiment not shown cooperates with the mobile group 3 without causing the movement of said mobile group 3.

Conveniently, the device 1 is configured in so as to present at least one condition $A_2$, wherein the translational element 2 cooperates with the mobile group 3 (see. FIG. 4$A_2$, 5$A_2$ or 6$A_2$), however, so that it is said translational element 2 (whose movement is caused from an external action/force) reverse the movement of the mobile group 3.

Preferably, the device 1 according to the invention is configured so that, during said first phase in which the closing movement/rotation of the leaf/hinge can be activated and caused only by an external force/action, at least one of the following two conditions is met:

a condition $A_1$ in which the translating element 2 does not cooperate (i.e. it is not in contact) with the mobile group 3 (see FIG. 4$A_1$, 5$A_1$ or 6$A_1$) or (in a possible embodiment not shown) cooperates (ie is in contact) with the mobile group 3 but without causing its movement, and/or a condition $A_2$ in which the translating element 2 cooperates with the mobile group 3 (see FIG. 4$A_2$, 5$A_2$ or 6$A_2$) so that it is said translating element 2 (whose movement is caused by an action/external force) to cause the movement of the mobile group 3.

Conveniently, the first phase comprises—preferably in sequence—conditions $A_1$ and/or $A_2$.

Conveniently, when the device is in conditions $A_1$ and $A_2$, in the absence of external force/action, the translating element 2 remains stationary and, correspondingly, the door/hinge remains stationary and maintains its angular position.

Conveniently, conditions $A_1$ and/or $A_2$ of device 1 correspond to opening conditions of the leaf/hinge 100 in stable equilibrium (in the absence of external forces on the leaf/hinge) or to a movement condition of closing the hinge controlled from the outside.

Preferably, in said condition $A_1$—in which the translating element 2 does not cooperate and is not in contact with the mobile group 3 or in which the translating element 2 cooperates with the mobile group 3 but without causing its movement—said elastic means 4 can be unloaded and fully elongated, or they can be loaded and compressed. Preferably, in said condition $A_1$—in which the translating element 2 does not cooperate and is not in contact with the mobile group 3 or in which the translating element 2 cooperates with the mobile group 3 but without causing its movement—the elastic means 4 maintain their condition which can be unloaded or (partially) loaded. In particular, since there is no movement of the mobile group 3, the elastic means 4 do not undergo any variation in their stress and, therefore, maintain their state of stress or non-stress.

Preferably, in said condition $A_2$—in which the translating element 2 cooperates with the mobile group 3 so that the translation of said translating element 2 causes the movement of the mobile group 3—said elastic means 4 are loaded and compressed.

Conveniently, the device 1 according to the invention is configured so that, during said second phase—in which the closing (or opening) movement/rotation of the leaf/hinge takes place automatically—the translation movement of the element translating unit 2 is caused/actuated by the elastic means 4 through said mobile group 3 cooperating with said translating element 2. In substance, during said second phase, it is the mobile group 3, actuated by the elastic means 4, which causes the translation of said translating element 2.

Conveniently, the device 1 is configured so that, during said second phase of automatic closing or opening rotation of the leaf, it comprises at least one condition $B_2$ in which:

the mobile group 3 cooperates with said translating element 2 so that the movement of said mobile group 3 causes the translation of said translating element 2, and the movement of said mobile group 3 is caused/carried out by the elastic means 4 which unload/lengthen.

Conveniently, the device 1 is configured in such a way as to present a condition $B_1$ (which is reached following the previous movement caused by the translating element 2 on the mobile group 3) in which the elastic means 4, previously loaded and compressed, are free to unload/stretch (see FIG. 4$B_1$, 5$B_1$, 6$B_1$ or 7$B_1$).

Conveniently, the device 1 is configured in such a way as to present at least one condition $B_2$ in which the movement of the mobile group 3, which drags the translating element 2 with it, is caused/actuated by the elastic means 4 which unload/lengthen (cf. FIG. 4$B_2$, 5$B_2$, 6$B_2$ or 7$B_2$).

Conveniently, the device 1 is configured in such a way as to present a condition $B_3$ in which the elastic means 4 (see FIG. 4$B_3$, 5$B_3$, 6$B_3$ or 7$B_3$) have completely unloaded/elongated and/or in which the translating element 2 or the mobile group 3 have reached an end stop position.

Preferably, the device 1 according to the invention is configured in such a way that, during said second phase, the following conditions are present in sequence:

- a condition $B_1$ (which is suitably reached following the previous movement caused by the translating element 2 on the mobile group 3) in which the elastic means 4, previously loaded and compressed, are free to unload/stretch (see FIG. 4$B_1$, 5$B_1$, 6$B_1$ or 7$B_1$),
- at least one condition $B_2$ in which the movement of the mobile group 3, which drags the translating element 2 with it, is caused/carried out by the elastic means 4 which unload/lengthen (see FIG. 4$B_2$, 5$B_2$, 6$B_2$ or 7$B_2$),
- a condition $B_3$ in which the elastic means 4 (see FIG. 4$B_3$, 5$B_3$, 6$B_3$ or 7$B_3$) have completely unloaded/elongated and/or in which the translating element 2 or the mobile group 3 have reached an end stop position.

Conveniently, said second phase comprises at least one of the conditions $B_1$, $B_2$ or $B_3$. Preferably, the second phase comprises in sequence the conditions $B_1$, $B_2$ or $B_3$.

In particular, advantageously, the device 1 is configured so that, at the end of said second phase of automatic closing or opening rotation of the leaf/hinge, it is in a condition $B_3$, preferably corresponding to complete closure, or opening, of the door/hinge, in which the elastic means 4 are completely unloaded/elongated and/or in which the translating element 2 or the mobile group 3 have reached an end stop position.

Conveniently, during the second phase of automatic closing (or opening) movement of, in particular in condition $B_2$ the leaf/hinge of device 1, the leaf/hinge 100 is in a series of intermediate opening conditions in unstable equilibrium (even in the absence of external stresses on the door/hinge).

Conveniently, the condition $B_3$ of the device 1 defines/corresponds to a stable closing (or opening) condition of the leaf/hinge 100.

Preferably, when the device 1 is in the conditions $A_1$ and/or $A_2$, the hinge bodies 101, 101' are separated from each other and not facing each other (ie the door is open), while when the device 1 is in the condition $B_3$, the hinge bodies 101, 101' are approached and facing each other (i.e. the door is closed), or vice versa (in an embodiment not shown).

Conveniently, in conditions $B_1$ and $B_2$ of device 1—advantageously indicated as "intermediate" as they are interposed between the stable conditions $A_1$ and/or A2 and the final stable condition $B_3$—the elastic means 4 are configured to force the movement of the mobile group 3, and therefore of the element 2, towards said final stable condition $B_3$, thus bringing the bodies 101, 101' of the hinge 100 closer together until they face each other.

Conveniently, during the closing (or opening) movement of the hinge 100 or the leaf, as described below, the device 1 then passes in sequence from condition A1 to condition $A_2$ to condition $B_1$ to condition $B_2$ to finally arrive to condition $B_3$.

In this way, when the device 1 is in conditions $A_1$ and/or $A_2$, the door/hinge 100 is able to maintain its open condition stably, thus allowing the user to keep the door in the open position without the need to apply additional and/or external locking means. Furthermore, when the device 1 passes and/or is in the conditions $B_1$ and/or $B_2$, the elastic means 4 exert their adjuvant action in the movement of the mobile group 3, of the translating element 2 and consequently of the hinge bodies 101, 101', to thus automatically bring the hinge 100, and therefore the door, into its closed condition.

As said, it is also understood that the device 1 according to the invention can also be applied to a door or hinge for the opening movement of the hinge 100 or the door, and in which the device 1 thus starts from condition $B_3$ and from the latter it passes to conditions $B_2$ and then $B_1$ to finally arrive at conditions $A_2$ and/or $A_1$, or in which the device 1 starts from condition $A_1$ and/or $A_2$ (corresponding to the closed condition of the leaf/hinge) and then passes to conditions $B_1$ and then $B_2$ to finally arrive at condition $B_3$ (corresponding to a condition of maximum opening of the door/hinge), without thereby departing from the scope of protection of this patent.

In substance, suitably, the closing or opening device 1 comprises the aforementioned group 3 which is movable between at least one condition $A_1$ and/or $A_2$, in which the movement (in rotation and/or translation) of said mobile group 3 is caused only by said translating element 2, and a condition $B_1$ and/or $B_2$ in which said elastic means 4 cause and/or contribute to the movement of said mobile group 3. Preferably, in said first rotation phase for closing or opening the leaf, the movement (in rotation and/or translation) of the mobile group 3 is caused only by said translating element 2 and—in particular—there is no contribution from the elastic means 4 or the contribution is irrelevant; while, in said second rotation phase for closing or opening the door, it is the elastic means 4 that cause and/or contribute to the movement of said mobile group 3.

Preferably, in said condition $A_1$ and/or $A_2$ of the device 1, the mobile group 3 is pushed by the translating element 2, which is operated from the outside, and carries out/runs through at least a first movement section (in rotation and/or translation) in which the action of the elastic means 4 is substantially inactive or it is irrelevant and in which, preferably, said elastic means 4 are loaded and compressed (or are further loaded and compressed); in said condition $B_1$ and/or $B_2$ of the device 1, the mobile group 3 is pushed by the elastic means 4 and carries out/runs through at least a second movement section (in which the elastic means 4 themselves are active and, in particular, unload/lengthen), thus bringing with it said translating element 2 which, as it is no longer operated from the outside, is therefore moved automatically.

Advantageously, in said condition $A_1$ and/or $A_2$ of the device 1, the elastic means 4 are compressed and, in particular, their elongation is prevented, and are therefore blocked. Advantageously, the condition $A_2$ of the device 1 lasts substantially until, following the thrust of the translating element 2 operated from the outside, the mobile group 3 reaches a position in which the elastic means 4 associated with said mobile group 3 are free to stretch out (i.e. they are no longer stuck).

Preferably, in said condition $B_2$ of the device 1, the movement of said mobile group 3 caused by the elastic means 4 also causes the (further) translation of said translating element 2, which is engaged by/with said mobile group 3, up to thus bring it to an end stop position (corresponding to condition $B_3$ of device 1).

Preferably, in said condition $A_1$ and/or $A_2$ of the device 1, the action of the elastic means 4 on the mobile group is null or substantially irrelevant. In particular, advantageously, the elastic means 4 are associated with the mobile group 3 so as to start causing the movement of the mobile group itself only when, following the movement caused by the translating element 2 on the mobile group 3, the device reaches the condition $B_1$.

Advantageously, as mentioned, starting from condition $B_1$ and in condition $B_2$ of the device 1, the latter is in a substantially unstable equilibrium condition and the elastic means 4 are configured to move said mobile group 3 towards the final stable condition $B_3$. More in detail, in the stable conditions $A_1$, $A_2$ and in the final stable condition $B_3$, the elastic means 4 of the device 1 do not act on the hinge bodies 101, 101' to force their opening or closing, but only intervene starting from condition $B_1$ and in condition $B_2$ to drag said hinge bodies 101, 101' towards one of the stable conditions, which correspond to at least one opening condition $A_1$, $A_2$ or to the closing condition $B_3$ for the door with respect to the fixed structure (for example a door jamb).

Conveniently, in accordance with the exemplary and preferential embodiments of the present invention illustrated in the attached FIGS. 4$A_1$-4$B_3$, 5$A_1$-5$B_3$, 6$A_1$-6$B_3$ and 7$A_1$-7$B_3$, the mobile group 3 is mechanically mounted on the containment body 11 and can be engaged by the translating element 2. Furthermore, the elastic means 4 are engaged on the mobile group 3.

Conveniently, the translating element 2 is configured to move, following an external action (for example a user) which causes the rotation of the door and therefore of the hinge, the mobile group 3. In fact, the translating element 2 slides inside the through hole 106 of the flanged container 103 of the hinge 100 pushed by the action of the pin 13 of the arm of articulation 102 following a movement of the door. Following its sliding, the translating element 2 activates the mobile group 3 consequently also moving the elastic means 4.

Advantageously, in accordance with the embodiment of the present invention illustrated in the attached FIGS. 4$A_1$-4$B_3$ and 5$A_1$-5$B_3$, the mobile group 3 comprises a rotating element 5 which rotates around an axis of rotation X mounted/constrained and integral with the hinge body 101, and in particular with respect to an axis which is mounted on a structure (for example the containment body 11) which is fixed to the hinge body 101. Preferably, the axis of rotation X of the rotating element 5 is substantially transverse/orthogonal with respect to a translation axis Y of the translating element 2.

Conveniently, in order to allow the means elastic bands 4 to intervene selectively only starting from the intermediate condition $B_2$, the rotating element 5 cooperates with the translating element 2 in correspondence with an engagement area 6 while is associated with the elastic means 4 in correspondence with a constraint point 7. The constraint point 7 of the elastic means 4 is advantageously misaligned, with respect to the rotation axis X, with the engagement area 6 for the translating element 2.

Advantageously, the rotating element 5 can have a substantially circular shape and, more particularly, it can be substantially discoidal in shape. Conveniently, in this case, the axis of rotation X substantially passes through the geometric axis of the rotating element 5, transversely with respect to the main plane of lying of the rotating element itself.

Conveniently, according to a further possible embodiment illustrated in the attached FIGS. 6$A_1$-6$B_3$, the mobile group 3 comprises a carriage 20 (or slide) which can rotate-translate along a guide 18 which is integral with the hinge body 101, and in particular along a guide 18 which is formed in depression and/or is mounted on a structure (for example the containment body 11) fixed to the hinge body 101.

Conveniently, according to a further possible embodiment illustrated in the attached FIGS. 7$A_1$-7$B_3$, the mobile group 3 comprises a rotating element 5 which rotates around an axis of rotation X and a further rotating element 50, preferably a lever, which rotates around an axis of rotation $X_2$ which is parallel to X. Preferably, the axes of rotation X and $X_2$ are parallel to each other. Preferably, the axes of rotation X and $X_2$ are both mounted/constrained and integral with the hinge body 101 and, in particular, are mounted on a structure (for example the containment body 11) which is fixed to the hinge body 101. Preferably, the axes of rotation X and $X_2$ are substantially transverse/orthogonal with respect to a translation axis Y of the translating element 2. Conveniently, in this case, it is only the further rotating element 50 of the mobile group 3 that comes into direct contact with the translating element 2, while the rotating element 5 of the mobile group 3 does not come into direct contact with the translating element 2, but interacts with the latter only through the further rotating element 50 of the mobile group itself.

Conveniently, the mobile group 3 also comprises a mobile body 51 which is moved, preferably in translation, by the further rotating element 50 of the mobile group itself. Preferably, the mobile body 51 is integral with an area of the further rotating element 50 which, with respect to the axis of rotation $X_2$, is opposite to the area (again of said further rotating element 50) cooperating with the translating element 2. Preferably, the further rotating element 50 activates the movement—with one of its regions or ends which is opposite to that which comes into contact with the translating element 2—of a mobile body 51 which is configured to come into direct contact with the rotating element 5. Preferably, the further rotating element 50, operated by the translating element 2, causes the translation of the mobile body 51 to bring it to interact with the rotating element 5. Conveniently, the mobile body 51 is moved along an axis translation $Y_2$, preferably in a direction opposite to that of movement of the translating element 2. Conveniently, in a possible embodiment, the mobile body 51 can be fixed to the further rotating element 50. Conveniently, in order to allow the elastic means 4 to intervene selectively only starting from the intermediate condition $B_2$, the rotating element 5 cooperates with the mobile body 51 moved from/with the further rotating element 50 in correspondence with an engagement area 6 while it is associated with the elastic means 4 in correspondence with a constraint point 7. The constraint point 7 of the elastic means 4 is advantageously misaligned, with respect to the axis of rotation X of the rotating element 5, with the engagement area 6 for the mobile body 51.

Advantageously, in the possible embodiment illustrated in the attached FIGS. 7$A_1$-7$B_3$ the rotating element 5 can have shape and characteristics corresponding to those of the rotating element 5 of the embodiment illustrated in the attached FIGS. 4$A_1$-4$B_3$ and, suitably, it is substantially circular and, more particularly, it can be substantially circular in shape, and, in particular, discoidal. Conveniently, in this case, the axis of rotation X substantially passes through the geometric axis of the rotating element 5, transversely with respect to the main lying plane of the rotating element itself.

Advantageously, in order to allow mechanical engagement with the translating element 2, the mobile group 3—suitably both in the case of the rotating element 5 and in the case of the carriage 20 and in the case of an assembly comprising the rotating element 5 and the further rotating element 50 which causes the translation of the mobile body 51—is equipped with a perimeter recess 9 defined by two lateral sides 9', 9" and which can be engaged by and cooperates with the translating element 2 (see FIG. 4$A_1$-4$B_3$, 5$A_1$-5$B_3$, 6$A_1$-6$B_3$) or with the mobile body 51 (see FIG. 7$A_1$-7$B_3$) operated by the translating element 2 by means of said further rotating element 50 of the mobile group 3. Preferably, in particular, the engagement area 6 of the mobile group 3 comprises said perimeter recess 9 obtained on the rotating element 5 or on the carriage/slide 20 of the mobile group 3.

In accordance with the preferential embodiment illustrated in the attached figures, the recess perimeter 9 is a depression and substantially in the shape of a "V" or "U", in which the lateral sides 9', 9" develop radially and are suitably inclined to each other.

Advantageously, the translating element 2 comprises—preferably at an opposite end with respect to that associated with the articulation arm 102 of the hinge 100—an engagement member 10 configured and/or intended to be engaged within the perimeter recess 9, for thus cooperating with the side walls, and in particular with a first side 9' and a second side 9". Advantageously, the engagement member 10 is integral (i.e. fixed or integrated) to the translating element 2 and protrudes externally/laterally from said translating element. Preferably, the engagement member 10 comprises a pin or a tooth which extends perpendicularly to the Y axis and parallel to the X axis.

Conveniently, in the embodiment of FIG. 7$A_1$-7$B_3$, the mobile body 51 is configured and/or intended to be engaged within the perimeter recess 9 of the rotating element 5, to thus cooperate with the lateral sides, and in particular with the first side 9' and the second side 9". Preferably, the mobile body 51 can have one or more of the aforementioned characteristics for the engagement member 10. More in detail, the engagement member 10 and/or the mobile body 51 is configured to push/move the movable assembly 3 intercepting a first lateral side 9' of the recess 9 to thus move the mobile group 3 from condition $A_2$ to condition $B_1$. Conveniently, the first lateral side 9' is the edge of the recess 9 which is first encountered (see FIGS. 4$A_2$, 5$A_2$, 6$A_2$ and 7$A_2$), from the temporal point of view, by the engagement member 10 of the translating element 2 or from the mobile body 51 of the mobile group itself, while the second lateral side 9" is the side of the recess 9 which is encountered second (see FIGS. 4$B_2$, 5$B_2$, 6$B_2$ and 7$B_2$) from the engagement member 10 of the translating element 2 or from the mobile body 51 of the mobile group 3.

Conveniently, following the contact of the translating element 2 with the movable assembly 3, the latter then rotates and/or translates in one direction concordant with the direction of translation along the Y axis of the translating element 2 (see embodiments of FIGS. 4$A_1$-4$B_3$ and 5$A_1$-5$B_3$).

Preferably, the elastic means 4 are associated with the mobile group 3 so as to define at least one condition, in the passage from condition $A_2$ to condition $B_1$, in which the elastic reaction of elongation of said elastic means 4 is substantially prevented and blocked (preferably against the contrast with the engagement member 10 of the translating element 2 and the thrust exerted by the latter), and at least one condition in which the elastic reaction of elongation of said elastic means 4 is released and causes movement of the mobile group 3, thus causing the translation of said translating element 2.

Preferably, in the condition $A_1$ of the device 1, that is, before the translating element 2 begins to cooperate and/or comes into contact with the mobile assembly 3, the latter is stationary and is substantially in a condition of equilibrium. In particular, the elastic means 4 are associated with the mobile group 3 so that, in the condition $A_1$ of the device 1, that is, before the translating element 2 begins to cooperate and/or comes into contact with the mobile group 3, said means elastic bands 4 are in a rest condition (i.e. they are unloaded and elongated) or they can be partially loaded and compressed, while the recess 9 is substantially facing the direction of translation of the translating element 2 or of the mobile body 51 operated.

Conveniently, the elastic means 4 are associated with the mobile group 3 so that, in the passage from condition $A_2$ to condition $B_1$ of the device 1, i.e. when the translating element 2 cooperates and comes into contact with the mobile group 3 causing movement of the latter (for example when the translating element 2 or the mobile body 51 comes into contact with the first side 9' of the recess 9), the elastic means 4 are loaded and, preferably, are compressed axially in contrast to the elastic reaction of said elastic means 4.

Conveniently, the elastic means 4 are associated with the mobile group 3 so that, following the movement in rotation and/or translation (which occurs in the passage from condition $A_2$ to condition $B_1$ of the device 1) of said mobile group 3 caused by translating element 2, the elastic means 4 themselves—which have been and are now compressed—reach a condition (corresponding to condition $B_1$ of the device) in which they are free to stretch. More in detail, when the elastic means 4 unload (during the condition $B_2$ of the device) and, in particular, stretch as a result of the previous compression, they cause a further movement in rotation and/or translation of said mobile group 3 which, coming into contact with the second side 9" of the recess 9, thus causes a further translation of the translating element 2 preferably towards an end stop position in which the elastic means 4 are unloaded and completely elongated (corresponding to condition $B_3$ of the device 1). Advantageously, in the condition $A_1$ of the device 1, i.e. before the translating element 2 (following its sliding) begins to cooperate with the mobile group 3 (i.e. before the engagement member 10 of the translating element 2 or the mobile body 51 of the movable assembly 3—which is in any case actuated by the action of the engagement member 10 of the translating element 2 on the further rotating element 50 of the movable assembly 3—comes into contact with the side 9'), said movable assembly 3 is stationary and, therefore, the closing movement of the hinge and therefore of the door is and can only be carried out by applying an external force/action, for example applied to the door by the user.

As the user pushes the leaf towards the fixed structure, the engagement member 10 of the translating element 2 approaches the mobile group 3 until it thus comes into contact with the latter (in particular by bringing the member engagement 10 of the translating element 2 or the mobile body 51 of the movable assembly 3 in contact with the side 9'), thus bringing the device into the condition $A_2$.

As can be clearly seen in the figures, the elastic means 4 (which in the variants of FIG. 4$A_1$-4$B_3$, FIG. 6$A_1$-6$B_3$ and FIG. 7$A_1$-7$B_3$ are aligned with the damper means 8 while in the variant of the FIG. 5$A_1$-5$B_3$ are misaligned) are opposed to the perimeter recess 9 with respect to the rotation axis (fulcrum) X. Preferably, the attachment point 7 of the elastic means 4 to the rotating element 5 is located on an ideal half (for example a semi-disc) into which the rotating element itself can be diametrically divided, while the perimeter recess 9 is located on another ideal half (for example corresponding to the remaining half-disc) of said rotating element.

Advantageously, both the damping means 8 and the elastic means 4 act on the translating element 2 with opposing forces. In particular, the spring of the elastic means 4 acts to force the movement towards the stable condition $B_3$ (which corresponds to for example to the closing condition of the door with respect to the fixed structure), while the shock absorber 80 of the damping means 8 acts to slow down this closing action carried out by the elastic means 4, in particular it acts to dissipate the energy of said elastic means 4.

In accordance with the first possible embodiment of the present invention (see FIG. 4$A_1$-4$B_3$ and FIG. 7$A_1$-7$B_3$), the spring of the elastic means 4 is housed inside the same cylindrical body 14 of the shock absorber 80, in particular the spring is interposed between an extremal wall 16 of the cylindrical body 14 and the rod 15.

In this situation, as mentioned, the spring of the elastic means 4 is first compressed (in the passage from condition $A_2$ to condition $B_1$) acquiring potential elastic energy which is then released during movement from condition $B_1$, in condition $B_2$ towards condition $B_3$, thus causing the automatic closing of the door/hinge.

Advantageously, moreover, during the whole or at least a part of the passage from condition $B_1$ to condition $B_3$ crossing the condition $B_2$, the damping means 8 partially oppose the elongation of the spring of the elastic means 4, braking the closing of the door and promoting a gentle and appreciable closure by the user. Preferably, the damping means 8 are configured to oppose and/or to oppose more the elongation of the elastic means 4 in correspondence with the terminal stretch of said elastic means 4.

In accordance with a first possible embodiment of the device of the present invention (see FIG. 4$A_1$-4$B_3$ and FIG. 7$A_1$-7$B_3$), the attachment point 7 of the elastic means 4 on the rotating element 5 coincides with the attachment point of the damping means 8.

In accordance with a second possible embodiment of the device of the present invention (see FIG. 5$A_1$-5$B_3$), the damping means 8 are mechanically constrained, and in particular rotatably constrained, to the rotating element 5 at a second constraint point 17, different from the first constraint point 7 of the elastic means 4.

More in detail, the second constraint point 17 of the damping means 8 is defined on the mobile group 3 in such a way that during the transition from the and $B_1$ towards condition $B_3$ by passing through condition $B_2$, the damping means 8 oppose the force applied by the elastic means 4, to slow down the closing of the door. Preferably, the damping means 8 are associated with the mobile assembly 3 so as to begin to act to oppose the elastic means 4, in particular to dissipate the energy of said elastic means, in correspondence with the end portion of the elongation stroke of the elastic means 4.

Suitably, the second constraint point 17 of the damping element 8 rotating means 5 is positioned so that during the rotation of the element 5 rotates towards the condition $B_3$ (i.e. in the example shown towards time in the attached figures), the rod 15 protrudes from the cylindrical body 14, opposing the elastic force exerted by the spring of the elastic means 4, thus braking the closing of the door.

Advantageously, the first attachment point 7 of the elastic means 4 to the rotating element 5 and the second attachment point 17 of the damping means 8 to the rotating element 5 are opposed to the perimeter recess 9 with respect to the axis (fulcrum) of rotation X. Preferably, the first attachment point 7 of the elastic means and the second attachment point 17 are located on an ideal half (for example a semi-disc) in which the rotating element 5 can be diametrically divided, while the perimeter recess 9 is located on another ideal half (for example corresponding to the remaining half-disc) of said rotating element. Preferably, the first attachment point 7 of the elastic means 4 and the second attachment point 17 are equidistant with respect to a diameter of the rotating element 5 passing through the perimeter recess 9 and the rotation axis X.

In accordance with a third possible embodiment of the present invention illustrated in the attached FIGS. 6$A_1$-6$B_3$, the mobile group 3 comprises a carriage/slide 20 which is slidingly engaged in a guide 18 obtained and/or mounted on the containment body 11 associated with the hinge body 101 of the hinge 100.

As mentioned, the carriage 20 is equipped with a perimeter recess 9 which is defined by two lateral sides 9', 9" and which can be engaged by the engagement member 10 integral with the translating element 2.

Conveniently, the carriage 20 comprises at least one protuberance 21 protruding and slidingly engaged in the guide 18. Preferably, said protuberance 21 comprises a protruding pin.

Advantageously, the guide 18 comprises a rail path with a first substantially curved section and with a second substantially rectilinear section which, preferably, extends consecutively to said first section.

The elastic means 4 are associated with the carriage 20 at a point 7 which is always aligned to a direction W corresponding to the direction of action/thrust/elongation of the elastic means 4. In particular, the elastic means 4 comprise a spring which acts on the head of a rod 15 which, at the other end, is engaged—preferably slidingly—with the carriage 20 at said first point 7. Advantageously, for this purpose, at the first point 7 the carriage comprises a pin which engages slidingly inside a slot 25 obtained at one end of the rod 15, or vice versa. Preferably, the elastic means 4 are configured to push the head of the rod 15 away from the guide 18.

Advantageously, said first section of the guide 18 is located in a distal position with respect to the elastic means 4. Advantageously, the direction of development of said second section of the guide 18 corresponds and/or is parallel to the direction of action W of the elastic means 4 and, moreover, preferably corresponds and/or is parallel to the direction of translation Y of the translating element 2.

Conveniently, the first curved portion of the guide 18 has a first limit switch 19 disposed angled/misaligned with respect to the direction of action W of the elastic means 4. Conveniently, the second rectilinear section of the guide 18 has a second end stop which is aligned with the direction of action W of the elastic means 4. Preferably, the first and second limit switches are defined at the opposite ends of the guide 18.

The fingers 4 are associated with the carriage 20 so as to push the latter from said first substantially curved section towards said second substantially rectilinear section, and preferably towards said second end stop.

Therefore, suitably, said elastic means 4 are associated with the carriage so that:

- when the protuberance 21 is in said first limit switch 19 and/or in said first curved section of the path 18 (corresponding to conditions $A_1$ and $A_2$ of device 1), any thrusting action of the elastic means 4 on the carriage 20 is thus prevented/blocked,
- when the protuberance 21 passes and is at the end of said first curved section and/or at the beginning of said second straight section of the path 18, (corresponding to the conditions $B_1$ and $B_2$ of the device 1) the action of the elastic means 4 it pushes and causes the carriage 20 to move along/towards said second rectilinear section, preferably towards said second end stop.

Preferably, moreover, also the embodiment of the device of FIGS. 6$A_1$-6$B_3$ can comprise damper means 8. Advantageously, said damper means 8 can be rotatably constrained to the carriage 20 at the same attachment point 7 as the elastic means 4. However, in another possible embodiment (here not shown) of the present invention, the damping means 8 can be constrained to the carriage 20 in a different attachment point with respect to the attachment point of the elastic means 4, in a manner substantially corresponding to what is illustrated for example in FIGS. 5$A_1$-5$B_3$.

Advantageously, in more detail, the spring of the elastic means 4 can be housed inside the cylindrical body 14 of the damping means 8 and, in particular, said spring can be interposed between the head of the rod 15 and the extremal wall 16 of the cylindrical body 14 itself. Advantageously, the rod 15 is movable inside the cylindrical body 14 along the direction W (as illustrated in the attached FIGS. 6$A_1$ and 6$A_2$) pushed in one direction by the action of the elastic means 4, while the damping means 8 act along the same direction W by adjusting the movement speed of the rod 15.

Conveniently, when the leaf—and therefore the hinge—is completely open, the device 1 is in the condition A1 in which the translating element 2 does not cooperate and is not in contact with the carriage 20, which is blocked with its protuberance 21 in the position of the limit switch 19 in which the elastic means 4 do not allow forcing the movement of the carriage 20.

As the user pushes the leaf towards the fixed structure the engagement member 10 of the translating element 2 approaches the carriage 20 until it comes into contact with the first side 9' of the recess 9, thus arriving at the condition $A_2$ of the device 1.

Then continuing to push towards the fixed structure, the engagement member 10 of the translating element 2, which comes into contact with the first side 9' of the recess 9, causes the carriage 20 to move, and in particular, the protuberance 21 of the carriage moves away from the first end stop position 19 by sliding along the first curved section.

When then, following the movement of the carriage 20 along the guide 18, the protuberance 21 passes and is substantially at the end of the first curved section and/or at the beginning of said second straight section of the path 18 (corresponding to the condition B1 of the device 1), the action of the elastic means 4 can intervene on the carriage 20 to push/move it along said second straight section (corresponding to condition $B_2$ of device 1), preferably towards said second end stop (corresponding to condition $B_3$ switch of the device 1).

In particular, in the passage from condition $B_1$ to condition $B_2$ of the device 1, the thrusting action of the elastic means 4 brings the second lateral side 9" of the recess of the carriage 20 to abut against the engagement member 10, which thus pushes said engagement member 10, and therefore the translating element 2, towards the final stable condition $B_3$, under the action of the same elastic means 4.

Preferably, during all the pushing/stretching action of the elastic means 4 on the carriage 20 or, preferably, only in a terminal portion of the thrust/elongation of the elastic means 4 (i.e. when the protuberance 21 of the carriage 20 approaches the second end stop), the shock absorber 80 of the damper means 8 acts to slow down the action thrust of the carriage 20 caused/implemented by the elastic means 4, in particular it acts to dissipate the energy of said elastic means 4.

Preferably, in the final stable condition $B_3$, the carriage 20 is engaged to the guide 18 and is located in correspondence with and/or in the vicinity of the elastic means 4 and/or damping means 8, in particular in correspondence with the second end of stroke of the guide or in abutment against the cylindrical body 14 of the damping means 8.

In accordance with a fourth possible embodiment of the present invention illustrated in the attached FIGS. 7$A_1$-7$B_3$, the movable assembly 3 comprises a rotating element 5 which is operated by the mobile body 51 which, in turn, is operated by or which is part of a further rotating element 50, which in turn is again driven by the engagement member 10 of the translating element 2. As mentioned, the rotating element 5 is equipped with a perimeter recess 9 which is defined by two lateral sides 9', 9" and which is engageable by the mobile body 51 actuated by the further rotating element 50 of the mobile group 3.

More in detail, the mobile body 51 actuated by the further rotating element 50 of the mobile group 3 is configured to push/move the rotating element elements 5 of the mobile group itself, intercepting a first lateral side 9' of the recess 9 to thus move the rotating element 5 from condition $A_2$ towards condition $B_1$. Conveniently, the first lateral side 9' is the side of the recess 9 which is first encountered (see FIG. 7$A_2$), from the temporal point of view, by the mobile body 51 of the mobile group itself, while the second lateral side 9" is the edge of the recess 9 which is encountered second (see FIG. 7$B_2$) by the mobile body 51 of the mobile group 3.

Conveniently, following the contact of the translating element 2 with the mobile group 3, the further element rotating element 50 rotates in a direction concordant with the direction of translation along the Y axis of the translating element 2, while the rotating element 5—once the mobile body 51 has come into contact with it—rotates in an opposite direction with respect to direction of translation along the Y axis of the translating element 2.

Preferably, the elastic means 4 are associated with the mobile group 3 so as to define at least one condition, in the transition from condition $A_2$ to condition $B_1$, in which the elastic reaction of lengthening of said elastic means 4 is substantially impeded and blocked (preferably in the face of the contrast with the engagement member 10 of the translating element 2 and the thrust exerted by the latter), and at least one condition in which the elastic reaction of elongation of said elastic means 4 is released and causes movement of the mobile group 3, thus causing the translation of said translating element 2.

Preferably, in the condition A1 of the device 1, that is, before the translating element 2 begins to cooperate and/or comes into contact with the further rotating element 50 of the mobile group 3, the rotating element 5 of the mobile group itself is stationary and is substantially in a condition of equilibrium. In particular, the elastic means 4 are associated with the rotating element 5 of the mobile group 3 so that, in the condition A1 of the device 1, that is, before the translating element 2 begins to cooperate and/or comes into contact with the mobile group 3 (and in particular with the further rotating element 50), said elastic means 4 are in a rest condition (i.e. they are unloaded and elongated) or they can be partially loaded and compressed, while the recess 9 is substantially facing the direction of translation of the translating element 2.

Conveniently, in the condition A1 of the device 1, i.e. before the translating element 2 (following its sliding) begins to cooperate with the further rotating element 50 of the mobile group 3 (i.e. before that the mobile body 51 of the mobile group 3—which is in any case actuated by the action of the engagement member 10 of the translating element 2 on the further rotating element 50 of the mobile group 3—comes into contact with the side 9'), said mobile group 3 is stationary and, therefore, the closing movement of the hinge and therefore of the door is and can only be carried out by applying an external force/action, for example applied to the door by of the user.

Conveniently, as the user pushes the door towards the fixed structure, the engagement member 10 of the translating element 2 approaches the further rotating element 50 until it comes into contact with the latter, then causing the its rotation around the $X_2$ axis. Conveniently, this rotation of the further rotating element 50 around the axis $X_2$ thus causes the mobile body 51 to move towards the first side 9' of the recess 9, thus arriving at the condition $A_2$ of the device 1.

Conveniently, the elastic means 4 are associated with the mobile group 3 so that, in the passage from condition $A_2$ to condition $B_1$ of the device 1, i.e. when the mobile body 51 operated by the further rotating element 50 cooperates and comes into contact with the rotating element 5 causing the movement of the latter (for example when the mobile body 51 comes into contact with the first side 9' of the recess 9), the elastic means 4 are loaded and, preferably, are compressed axially in contrast to the elastic reaction of said elastic means 4.

Conveniently, the elastic means 4 are associated with the rotating element 5 of the mobile group 3 so that—following the movement in rotation and/or translation (which takes place in and the passage from condition $A_2$ to condition $B_1$ of the device 1) of the rotating element 5 caused by the mobile body 51 operated by the further rotating element 50 which, in turn, is actuated by the translating element 2—the elastic means themselves, which have been and are found to be compressed, reach a condition (corresponding to condition $B_1$ of the device) in which they are free to stretch. More in detail, when the elastic means 4 are unloaded (during the condition $B_2$ of the device) and, in particular, they elongate following the previous compression, they cause a further movement in rotation and/or translation of the rotating element 5 of the mobile group 3 which, upon coming into contact with the second side 9" of the recess 9, thus causes—by means of the mobile body 51 and the further rotating element 50—a further translation of the translating element 2, preferably towards a position of limit switch in which the elastic means 4 are unloaded and completely elongated (corresponding to condition $B_3$ of device 1).

Preferably, moreover, also the embodiment of the device of FIGS. $7A_1$-$7B_3$ can comprise damper means 8. Advantageously, said damper means 8 can be rotatably constrained to the rotating element 5 of the mobile group 3 at the same attachment point 7 as the elastic means 4. However, in another possible embodiment (not shown here) of the present invention, the damping means 8 can be constrained to the rotating element 5 of the mobile group 3 in a different constraint point with respect to the constraint point of the elastic means 4, substantially corresponding to what for example illustrated in FIGS. $5A_1$-$5B_3$.

Advantageously, in more detail, the spring of the elastic means 4 can be housed inside the cylindrical body 14 of the damping means 8 and, in particular, said spring can be interposed between the head of the rod 15 and the extremal wall 16 of the cylindrical body 14 itself. Advantageously, the rod 15 is movable inside the cylindrical body 14 pushed in one direction by the action of the elastic means 4, while the damper means 8 act along the same direction, regulating the movement speed of the rod 15.

Preferably, during the whole length of the thrust/elongation action of the elastic means 4 on the rotating element 5 of the mobile group 3 or, preferably, only in a terminal portion of the thrust/elongation of the elastic means 4, the shock absorber 80 of the damper means 8 acts to slow down the thrusting action of the rotating element 5 caused/carried out by the elastic means 4, in particular it acts to dissipate the energy of said elastic means 4. Conveniently, up to a certain angle (for example of about 10°-45°, preferably of about 30°), preferably predefined and adjustable, with respect to the closing configuration of the hinge, and therefore of the door, the closing or opening movement (first phase) can be carried out only following an external action by the user on the leaf, while when the leaf/hinge reaches and/or defines, with respect to this closing configuration, an angle lower than said determined angle, the closing movement of the door/hinge is carried out automatically (second phase), i.e. without requiring any external action/force, in particular from the user.

Advantageously, then, during the entire (second) phase of automatic closing movement or when the door reaches and/or defines, with respect to this closing configuration, an angle lower than a second angle (which is lower than said angle and which, for example, is about 10-30°), the damper means 80—and in particular the damper 80—act by slowing down the automatic closing movement of the door with respect to the jamb or other fixed structure.

Conveniently, it is understood that the device 1 as described above can be used for the closing movement of the door, but evidently for the skilled person it could also be used for the opening movement of the door.

The present invention also relates to a door opening and/or closing system comprising at least one retractable hinge 100 and also a device for opening and/or closing a door of the type described above, of which they will keep the same numerical references for simplicity of presentation.

Advantageously, the concealed hinge 100 is adjustable and, preferably, it is adjustable along all three Cartesian axes orthogonal to each other.

The hinge 100 of the automatic opening and/or closing system according to the invention can be advantageously used to rotatively connect a leaf with respect to a fixed structure, such as for example a door post. The hinge 100 of the automatic opening and/or closing system comprises two bodies 101, 101' articulated to each other by at least one pair of arms 102, 102' and which can be connected respectively to a door and to a fixed structure.

The device 1 of the automatic opening and/or closing system is associated, preferably is constrained, to one 101 of the two bodies of said hinge 100.

More in detail, the concealed hinge 100 comprises:

- a first body 101, with a corresponding first containment seat, intended to be inserted into a corresponding first cavity made in said door,
- a second body 101', with a second containment seat, intended to be recessed into a corresponding second cavity made in said fixed structure,
- arms 102 shaped like a rocker arm and associated with said bodies 101, 101' so as to allow rotation of the door with respect to said fixed structure.

Conveniently, the device 1, as described above, is associated—preferably is constrained—to the base of said first body of said hinge 101 and is intended to be inserted, together with said first body, into said first cavity made in said door.

Obviously, according to the present description, it must be understood that all the characteristics described above with reference to the device 1 are to be referred in the same way and application also to the automatic opening and/or closing system object of the present invention, which comprises a device 1 of the type described above, in all its possible embodiments.

From what has been said it is clear that the device, as well as the system, for opening and/or closing the door according to the invention, in all the embodiments described and represented here, is somewhat more advantageous than the traditional ones as:

- it is particularly compact and can be completely built into the door, thus avoiding any alteration of the aesthetic appearance of the door,
- it can be easily applied to many types of hinges, including traditional concealed ones, simply by providing a containment body to be recessed inside the door, or by providing a housing seat for the body of the hinge a little deeper,
- it is quick and easy to mount and assemble,
- allows the door leaf to be kept in the open position, obviating the need to actively lock the leaf with external means,
- turns out to be compact and with a reduced number of components,
- it allows both the slowing down of the automatic closing or opening of the door so as to avoid abrupt contacts between the door itself and the jamb, and the engagement of the snap lock associated with the door within the corresponding seat obtained in the jamb.

The present invention has been illustrated and described in some of its preferred embodiments, but it is understood that executive variations may be made, without however departing from the scope of protection of the present patent for industrial invention.

The invention claimed is:

1. Device (1) for closing and/or opening of a leaf, to be applied to a concealed hinge (100), the hinge (100) comprising two bodies (101, 101') articulated to each other through at least a pair of articulation arms (102, 102') and connectable respectively to a leaf and to a fixed structure, said device (1) configured to be associated with one (101) of said two bodies of said hinge (100), said device (1) comprising:

- a translating element (2) engageable to/with an articulation arm (102) of said hinge (100),
- at least one mobile group (3) configured to cooperate with said translating element (2) and which is mobile with respect to an element/structure (11) which can be mechanically fixed to a hinge body (101) to which said device is intended to be associated;
- elastic means (4) acting on said mobile group (3) to cause the movement of said mobile group (3) and said translating element (2);
- wherein said translating element (2), said at least one mobile group (3) and said elastic means (4) are configured and reciprocally arranged so that a closing or opening rotation of a door associated with said hinge (100) comprises:
- a first phase in which a closing or opening rotation of said leaf is activated and caused only by a force/action external to said device, by an external force/action exerted by a user on the leaf,
- a second phase of said closing or opening rotation, subsequent to said first phase, in which said elastic means (4) act on said mobile group (3) to cause movement of said mobile group (3) and therefore of said translating element (2), thus causing an automatic closing or opening rotation of the door;
- and wherein the device (1) is configured such that, during said first phase, the device (1) comprises a condition $A_1$ in which the translating element (2) does not cooperate with the mobile group (3) and/or cooperates with the mobile group (3) without causing movement of the mobile group (3).

2. The device according to claim 1, wherein the device (1) is configured in such a way that passage from the first phase to the second phase is caused by the movement in rotation and/or translation of said mobile group (3) and wherein said movement of the mobile group (3) is caused by the translation of said translating element (2).

3. The device according to claim 1, wherein in said condition $A_1$ the elastic means (4) associated with the mobile group (3) are not stressed and thus maintain their stressed or non-stressed state.

4. The device according to claim 1, wherein the device (1) is configured in such a way that, during said first phase in which the closing or opening rotation of said door is operated and caused only by an external force/action, said device also comprises a condition $A_2$ in which the translating element (2) cooperates with the mobile group (3) so that the translation of said translating element (2) causes the movement of the mobile group (3) and so that an elastic reaction of elongation of said elastic means (4) is blocked/prevented.

5. The device according to claim 4, wherein in said condition $A_2$ in which the translating element (2) cooperates with the mobile group (3) so that the translation of said translating element (2) causes movement of the mobile group (3), said elastic means (4) are loaded and compressed.

6. The device according to claim 1, wherein the device (1) is configured so that, during said second phase, said device also comprises at least one condition $B_1$ in which the elastic means (4), previously loaded and compressed, are free to extend to thus cause the automatic movement of said mobile group (3), and therefore of said translating element (2), and therefore of said door.

7. The device according to claim 1, wherein the device (1) is configured so that, during said second phase of automatic closing or opening rotation of the leaf, said device comprises at least one condition $B_2$ in which:

- the mobile group (3) cooperates with said translating element (2) so that the movement of said mobile group (3) causes the translation of said translating element (2), and
- the movement of said mobile group (3) is caused/carried out by the elastic means (4) which unload/lengthen.

8. The device according to claim 1, wherein the device (1) is configured such that, at the end of said second phase of automatic closing or opening rotation of the leaf, the device (1) is in a condition $B_3$, corresponding to a complete closing, or opening, of the door, in which the elastic means (4) are completely unloaded/elongated.

9. The device according to claim 1, wherein the device (1) is configured in such a way that, at the end of said second phase of automatic closing or opening rotation of the leaf, it is in a condition $B_3$, corresponding to a complete closing or opening of the door, in which the translating element (2) or the mobile group (3) have reached an end stop position.

10. Device (1) for closing and/or opening of a leaf, to be applied to a concealed hinge (100), the hinge (100) comprising two bodies (101, 101') articulated to each other through at least a pair of articulation arms (102, 102') and connectable respectively to a leaf and to a fixed structure, said device (1) configured to be associated with one (101) of said two bodies of said hinge (100), said device (1) comprising:

a translating element (2) engageable to/with an articulation arm (102) of said hinge (100), at least one mobile group (3) configured to cooperate with said translating element (2) and which is mobile with respect to an element/structure (11) which can be mechanically fixed to a hinge body (101) to which said device is intended to be associated;

elastic means (4) acting on said mobile group (3) to cause the movement of said mobile group (3) and said translating element (2);

wherein said translating element (2), said at least one mobile group (3) and said elastic means (4) are configured and reciprocally arranged so that a closing or opening rotation of a door associated with said hinge (100) comprises:

a first phase in which a closing or opening rotation of said leaf is activated and caused only by a force/action external to said device, by an external force/action exerted by a user on the leaf, a second phase of said closing or opening rotation, subsequent to said first phase, in which said elastic means (4) act on said mobile group (3) to cause movement of said mobile group (3) and therefore of said translating element (2), thus causing an automatic closing or opening rotation of the door;

and wherein the device (1) is configured such that, during said first phase, the device (1) comprises a condition $A_1$ in which the translating element (2) does not cooperate with the mobile group (3) and/or cooperates with the mobile group (3) without causing movement of the mobile group (3), wherein said mobile group (3) comprises:

at least one carriage (20) or slide which can rototranslate along a guide (18) which is integral with a containment body (11) which can be associated with the hinge body (101).

11. The device according to claim 10, wherein said mobile group (3) comprises a single rotating element (5) which rotates around an axis of rotation X, which is mounted/constrained and integral with a containment body (11) associable with the hinge body (101) and which is substantially transverse/perpendicular with respect to the translation axis Y of said translating element (2).

12. Device (1) for closing and/or opening of a leaf, to be applied to a concealed hinge (100), the hinge (100) comprising two bodies (101, 101') articulated to each other through at least a pair of articulation arms (102, 102') and connectable respectively to a leaf and to a fixed structure, said device (1) configured to be associated with one (101) of said two bodies of said hinge (100), said device (1) comprising:

a translating element (2) engageable to/with an articulation arm (102) of said hinge (100), at least one mobile group (3) configured to cooperate with said translating element (2) and which is mobile with respect to an element/structure (11) which can be mechanically fixed to a hinge body (101) to which said device is intended to be associated;

elastic means (4) acting on said mobile group (3) to cause the movement of said mobile group (3) and said translating element (2);

wherein said translating element (2), said at least one mobile group (3) and said elastic means (4) are configured and reciprocally arranged so that a closing or opening rotation of a door associated with said hinge (100) comprises:

a first phase in which a closing or opening rotation of said leaf is activated and caused only by a force/action external to said device, by an external force/action exerted by a user on the leaf, a second phase of said closing or opening rotation, subsequent to said first phase, in which said elastic means (4) act on said mobile group (3) to cause movement of said mobile group (3) and therefore of said translating element (2), thus causing an automatic closing or opening rotation of the door, wherein the device (1) is configured such that, during said first phase, the device (1) comprises a condition $A_1$ in which the translating element (2) does not cooperate with the mobile group (3) and/or cooperates with the mobile group (3) without causing movement of the mobile group (3), wherein said mobile group (3) comprises at least one of:

-at least one rotating element (5) which rotates around an axis of rotation X, which is mounted/constrained and integral with a containment body (11) which can be associated with the hinge body (101) and which is substantially transverse/perpendicular to the translation axis Y of said translating element (2), or at least one carriage (20) or slide which can rototranslate along a guide (18) which is integral with a containment body (11) which can be associated with the hinge body (101), wherein said mobile group (3) further comprises at least one further rotating element (50) which rotates around an axis of rotation $X_2$, which is mounted/constrained and integral with a body of containment (11) associable with the hinge body (101) and which is substantially transverse/perpendicular with respect to the translation axis Y of said translating element (2), and is configured so that said translating element (2) and said rotating element (5) cooperate with each other by means of said at least one further rotating element (50).

13. The device according to claim 12, wherein the mobile group (3) further comprises a mobile body (51) which is driven in movement/in translation, by the at least one further rotating element (50) of the mobile group itself.

14. The device according to claim 13, wherein said mobile body (51) is integral with or cooperates with an area of the at least one further rotating element (50) which, with respect to the axis of rotation $X_2$, is opposite to the area cooperating with the translating element (2).

15. The device according to claim 1, further comprising damping means (8) acting on the mobile group (3), for the whole or at least a part of said second rotation phase of closing, or opening, of the leaf, to dissipate energy of said elastic means (4), and thus slow down the translation speed of the translating element (2) and therefore the automatic closing, or opening, of the leaf associated with said hinge.

16. The device according to claim 15, wherein said elastic means (4) and said damping means (8) are associated on the mobile group (3) so as to act along a same direction or are separately associated on the mobile group (3) in order to act along two different directions.

17. System for closing a door with respect to a fixed structure wherein the system comprises at least one retractable hinge (100) for articulating said door with respect to said fixed structure, said retractable hinge (100) comprises:

a first body (101), with a corresponding first containment seat, insertable into a corresponding first cavity made in said door, and a second body (101'), with a second containment seat, embeddable within a corresponding second cavity obtained in said fixed structure, arms (102,102') shaped like a rocker arm and associated with said bodies (101, 101') so as to allow the rotation of the door with respect to said fixed structure, and comprising a device for closing (1), according to claim 1, which is associated with said first body (101) or said second body (101').

18. The device according to claim 10, further comprising damping means (8) acting on the mobile group (3), for the whole or at least a part of said second rotation phase of closing, or opening, of the leaf, to dissipate energy of said elastic means (4), and thus slow down the translation speed of the translating element (2) and therefore the automatic closing, or opening, of the leaf associated with said hinge.

19. The device according to claim 12, further comprising damping means (8) acting on the mobile group (3), for the whole or at least a part of said second rotation phase of closing, or opening, of the leaf, to dissipate energy of said elastic means (4), and thus slow down the translation speed of the translating element (2) and therefore the automatic closing, or opening, of the leaf associated with said hinge.

20. System for closing a door with respect to a fixed structure wherein the system comprises at least one retractable hinge (100) for articulating said door with respect to said fixed structure, said retractable hinge (100) comprises:

a first body (101), with a corresponding first containment seat, insertable into a corresponding first cavity made in said door, and a second body (101'), with a second containment seat, embeddable within a corresponding second cavity obtained in said fixed structure, arms (102,102') shaped like a rocker arm and associated with said bodies (101, 101') so as to allow the rotation of the door with respect to said fixed structure, and comprising a device for closing (1), according to claim 10, which is associated with said first body (101) or said second body (101').

* * * * *